United States Patent Office 2,998,285
Patented Aug. 29, 1961

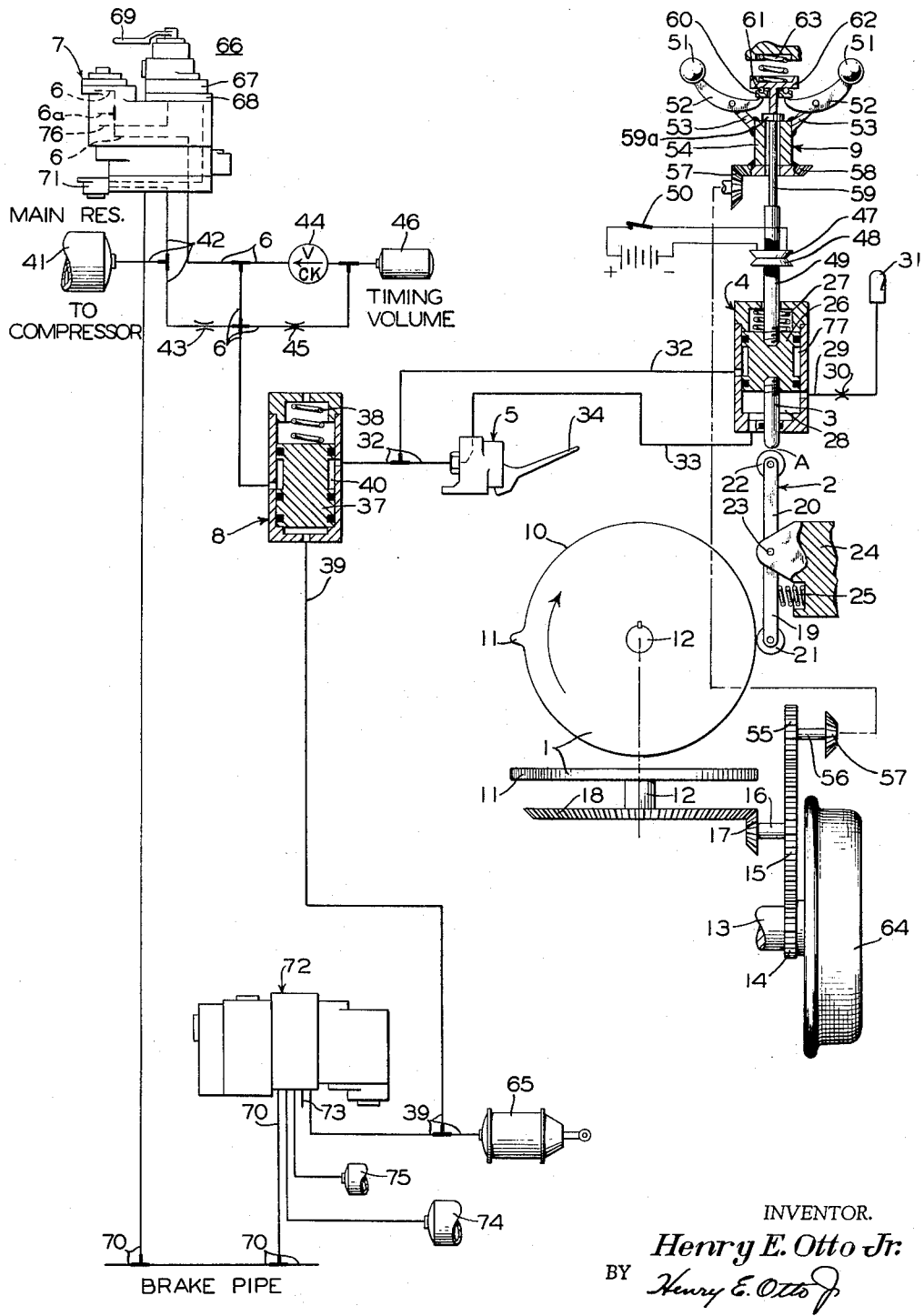

2,998,285
FLUID PRESSURE BRAKE APPARATUS WITH PERIODIC ACKNOWLEDGEMENT TYPE SAFETY CONTROL
Henry E. Otto, Jr., Pitcairn, Pa., assignor to Westinghouse Air Brake Company, Wilmerding, Pa., a corporation of Pennsylvania
Filed Nov. 27, 1959, Ser. No. 855,810
13 Claims. (Cl. 303—19)

This invention relates to control systems requiring periodic actuation by an operator to demonstrate his alertness so as thereby to prevent the occurrence of a control operation which will otherwise be effected automatically by such system. The invention relates more particularly to a control system of the above type in which the time interval between the required successive periodic actuations varies in direct proportion with the linear speed of a prime mover, such as a railway locomotive, or rotative speed of a diesel engine or generator mounted in a fixed location.

It is customary to equip railway locomotives with brake apparatus comprising a "dead man" or safety control valve device operative to initiate a safety control application of automatic fluid pressure brakes, unless a pedal is maintained depressed by the engineer at all times except under certain conditions, such as during a manually effected brake application. This safety control feature will be nullified if the engineer places a heavy object, such as a tool box, on the pedal or if he should become ill and slump in such a way as to maintain the pedal depressed. To prevent nullification of this feature, locomotive fluid pressure brake apparatus has been proposed embodying control systems requiring periodic acknowledging operations at the expiration of successive fixed time intervals, irrespective of the speed at which the locomotive is traveling. If this time interval between acknowledging operations is fixed at two minutes, and the engineer should become stricken just after having made an acknowledgement, a train traveling at 60 miles per hour would cover two miles before the safety control application would be initiated by his failure to make the next acknowledgement. On the other hand, if this fixed time interval is shortened, more frequent acknowledgements will be required at all speeds.

The principal object of this invention is therefore to provide an improved control system requiring periodic acknowledgement by an operator at the expiration of successive time intervals which vary in duration according to the speed of the prime mover so as to require more frequent acknowledgements as such speed increases and thus assure alertness of the operator when alertness is critical.

Another object of the invention is to provide an improved control system of the above general type in which the time interval between acknowledgements corresponds to that necessary for a vehicle, such as a railway locomotive, to travel a predetermined distance, which distance will be covered in successively shorter time intervals as locomotive ground speed increases.

A further object is to provide a locomotive fluid pressure brake apparatus embodying a control system of the type described in the preceding objects and requiring periodic acknowledgements by the engineer in order to prevent an automatic safety control application of fluid pressure brakes on a locomotive and the connected cars of a train.

According to these objects, the improved control system comprises a control pipe which is normally charged with fluid under pressure from a source at a restricted rate; a valve device which responds to a reduction in control pipe pressure to below a preselected value to effect a desired control operation; an acknowledging valve device which must be periodically actuated between two positions by an operator to prevent such reduction in control pipe pressure; and a pilot valve device which is periodically operated to an exhaust position, in which it vents the control pipe at a restricted but greater rate, in response to actuation of a trigger mechanism by a cam member that is rotatable at a variable speed proportionate to the linear or rotative speed of the prime mover. The control system also preferably comprises a speed-controlled device for preventing operation of the pilot valve device to abnormal position when prime mover speed is below a chosen low value, and a suppression valve device operative to cut off the control pipe from the acknowledging valve device and pilot valve device under a preselected condition where alertness of the operator is demonstrated by his performance of some other operation.

Other objects and advantages will become apparent from the following more detailed description of the invention, and from the accompanying drawing wherein the single figure is a diagrammatic view of a control system embodying the invention shown associated with components of a railway locomotive fluid pressure brake apparatus, said system requiring periodic actuation by an operator in order to prevent an automatic safety control application of fluid pressure brakes on the locomotive and connected cars of a train.

*Description*

As shown in the drawing, the control system embodying the invention comprises a cam member 1 rotatable at a variable speed; a trigger mechanism 2 actuated by the cam member; a double-acting pusher stem 3 connected to a pilot valve device 4 and serving at different times to hold said pilot valve device in a normal position or in an abnormal position; an operator's acknowledging valve device 5; a normally charged control passage and pipe 6; and a control valve device 7 responsive to a reduction in control pipe pressure to below a preselected value to effect a desired control operation. This system also preferably comprises a suppression valve device 8 automatically operative to cut off the control pipe 6 from the valve devices 4 and 5 when the operator has performed some operation demonstrating his alertness; and a speed-controlled device 9 for holding the pilot valve device 4 in normal position when the rotative speed of the cam member 1 is less than a certain value.

Cam member 1 comprises a cylindrical surface 10 which joins a cam lobe 11 that subtends only a very small arcuate angle of the cam member. Cam member 1 is rotated by a drive shaft 12 that is arranged coaxially with the cylindrical surface 10 and, through the medium of a reduction gear train, is rotated by a shaft or axle 13 which is rotatable at different speeds. This gear train may comprise a small spur gear 14 which encircles and is keyed to the shaft or axle 13 and drives a large spur gear 15 that, through a shaft 16, rotates a small bevel gear 17 that drives a large bevel gear 18 keyed to shaft 12.

The trigger mechanism 2 may comprise a lever having two arms 19, 20 at the outer ends of which are carried respective rollers 21, 22. Intermediate its arms the lever 19, 20 is rockably fulcrumed on a pin 23 carried by a fixed element 24. A helical bias spring 25 acts on the lever to normally maintain follower roller 21 in rollable contact with cylindrical surface 10 or lobe 11, as the case may be, during rotation of cam member 1. When roller 21 contacts surface 10, lever arm 20 will be disposed in coaxial alignment with pusher stem 3.

Pilot valve device 4 may comprise a spool-type valve 26 that is sealingly reciprocable in a sectionalized casing and subject at one end to pressure of a helical spring 27 in an atmospheric chamber and subject at the opposite end to pressure of fluid in a chamber 28. The pusher stem 3 is coaxially connected to the said opposite end of valve 26 and projects sealingly through an aligned bore in the end wall of chamber 28. When lever arm 20 is coaxially aligned with stem 3, as shown, roller 22 is adapted through contact with said stem to operatively hold valve 26 in a normal position, in which it is shown, against resistance of spring 27. With valve 26 in normal position, chamber 28 will be uncovered to a pipe 29 containing a choke 30 and leading to a pneumatically operated warning device such as a whistle 31; and pipe 29 will be cut off from a pipe 32 leading to valve device 5.

Acknowledging valve device 5 comprises valve means (not shown) spring-biased to one position for connecting pipe 32 to a pipe 33 connected to chamber 28, and responsive to depression of a pedal 34 to disconnect said pipes from each other.

As already stated, the devices 8 and 9 are optional but are preferably provided. Suppression valve device 8 may comprise a spool-type valve sealingly reciprocable in a sectionalized casing and subject at one end to pressure of a helical spring 38 in an atmospheric chamber and at the opposite end to pressure of fluid in a pipe 39. When pressure in pipe 39 is below a chosen value, spring 38 will bias valve 37 to a normal or non-suppressing position, in which it is shown, and in which an elongated annular cavity 40 in said valve connects a branch of pipe 32 to the control pipe 6. If preferred, however, valve device 8 may be eliminated, in which case pipe 6 would be connected directly to pipe 32. Also, if preferred, valve device 5 may be identical in structure with valve device 8, with the single exception that the spool-type valve would be shiftable against resistance of the bias spring by a plunger pedal coaxially connected to the valve, instead of by fluid pressure in a pipe equivalent to pipe 39.

Control passage and pipe 6 is normally charged with fluid under pressure from a source, such as a reservoir 41, by way of a pipe 42 and choke 43, a check valve 44 and a choke 45 are arranged in parallel between control pipe 6 and a timing volume 46. Check valve 44 prevents flow from pipe 6 to volume 46 so that the latter will be charged at the restricted rate controlled by choke 45, but permits pressure fluid to flow from said volume to pipe 6 at a substantially unrestricted rate.

Speed-controlled device 9 may comprise a fly-ball-type governor and a disc-shaped electro-magnet 47 axially movable thereby into and out of contact with a metallic disc 48 coaxially connected to the spring side of valve 26 by a stem 49 preferably formed of an insulating material such as plastic or hard rubber. Magnet 47 is energized upon closure of a manual switch 50, which may also be the same switch that effects supply of electrical energy to the traction motors (not shown) of a diesel-electric locomotive to condition such locomotive for service; in such event, the electrical circuits for said magnet and for the traction motors would be arranged in parallel for control by the single switch 50.

The fly-ball governor comprises fly-balls 51 carried at the outer ends of two oppositely arranged arms 52 that, intermediate their ends, are rockably supported on pins carried by inclined struts 53 secured to the exterior of a sleeve 54 that is rotatably driven by the shaft or axle 13 through a gear train. This gear train may comprise gears 14, 15 and a spur gear 55 which is driven by gear 15 and, through a shaft 56 and a bevel gear 57, drives a bevel gear 58 that is coaxially secured to and effects rotation of the sleeve 54 and thereby of the fly-balls 51. Magnet 47 is coaxially connected to an insulated lower portion of the shaft 59 that projects upwardly with radial clearance through sleeve 54. A washer 60, which loosely encircles the upper part of shaft 59, is engaged at its underside by the inner ends of arms 52.

A plurality of balls 61 ride in annular grooves formed in the upper and lower sides, respectively, of the washer 60 and of a dish-shaped spring seat 62 for a governor speeder spring 63; said seat being coaxially connected to the upper end of shaft 59. Thus, balls 61 provide a thrust-bearing-type connection between the shaft 59 and arms 52. As rotative speed of the sleeve 54 increases, the centrifugal force of the fly-balls 51 will act through arms 52, washers 60, balls 61 and seat 62 to shift the shaft 59 axially upward, without rotation, against resistance of speeder spring 63 and thus separate the magnet 47 from the disc 48 when a preselected speed of the locomotive, such as 5 miles per hour, is exceeded, as determined by the preselected bias of spring 63. When the speed of the locomotive drops below 5 miles per hour and centrifugal force of fly-balls 51 is reduced accordingly, shaft 59 will be moved downwardly by spring 63 to resume a normal position defined by engagement of a bearing collar 59a, fixed to shaft 59, with the end of sleeve 54 adjacent struts 53. With steam 59 in its normal position and with magnet 47 energized said magnet will contact disc 48 and exert sufficient pull on valve 26 to hold the latter in its normal position, as shown, against the opposing force of bias spring 27.

When the control system is associated with a locomotive fluid pressure brake apparatus, as shown in the drawing for purposes of illustration, the shaft or axle 13 will be one of the driving axles for a locomotive wheel 64; the reservoir 41 will be the main reservoir; the pipe 39 will be a branch of a brake cylinder pipe leading to a brake cylinder 65 on the locomotive; and valve device 7 may be the so-called service application portion or device of an engineer's automatic brake valve device 66 of the type designated as a "DSE–24–H Brake Valve" fully shown in drawing C–72550–64 of, and described in, Instruction Pamphlet No. 5066 dated August, 1950, published by Westinghouse Air Brake Company and covering a "24–RL Locomotive Brake Equipment."

This brake valve device comprises, briefly, a casing containing a rotary valve 67 and its fixed seat 68 (not shown in detail), said rotary valve being operable by arcuate movement of a handle 69 to various positions to operatively control pressure fluid in a brake pipe 70 that extends from the locomotive and from car to car through the train. When handle 69 is moved to a running position, rotary valve 67 establishes a communication whereby pressure is supplied from the main reservoir 41 via a reducing valve device 71 (referred to in the railway brake art as a "feed valve device") to the brake pipe 70 for charging the latter to a desired normal charge value and thereby, in the well-known manner, causing a brake controlling valve device 72 (such as the "D-24 Control Valve" shown in said pamplet) to connect the brake cylinder pipe 39 to a release pipe 73 for venting the brake cylinder 65 and also supply fluid under pressure from the brake pipe to an auxiliary reservoir 74 and an emergency reservoir 75.

The valve device 7 comprises valve means (not shown) subject to main reservoir pressure opposing pressure of fluid in the control passage 6 and a spring bias. When control passage 6 is fully charged, said valve means will be biased by the spring bias to a normal position in which, among other things, it cuts off a branch 6a of control passage 6 from a so-called lock-over passage 76 that is connected to atmosphere by rotary valve 67 in all positions of brake valve handle 69 except a lap position.

When, however, control passage pressure is reduced below a preselected value, such as about 35 p.s.i., the valve means of device 7 will be actuated by main reservoir pressure to an application position, in which control passage branch 6a is connected to lock-over passage 76, rotary valve 67 is cut off from brake pipe 70, and a full service reduction in brake pipe pressure will be effected in by-pass of rotary valve to cause brake controlling valve device 72 to supply pressure fluid from auxiliary reservoir 74 to brake cylinder 65 for effecting an automatic full service safety control application of brakes.

It will be understood that brake controlling valve devices are provided on all of the cars of the train and are controlled in substantially similar manner according to variations in pressure in the brake pipe 70 to control application and release of brakes on the respective cars.

Operation

Assuming initially that the brake apparatus is devoid of fluid under pressure, that switch 50 has been closed to energize magnet 47, and that roller 21 contacts surface 10 of cam member 1, the various components of the brake apparatus and control system will be in the respective positions in which they are shown in the drawing.

To initially charge the brake apparatus and condition the control system, fluid under pressure is supplied to main reservoir 41 from a compressor (not shown) on the locomotive, and brake valve handle 69 is temporarily moved to lap position to cause rotary valve 67 to cut off the lock-over passage 76 from atmosphere to permit effective charging of the control pipe and passage 6 from the main reservoir 41 via choke 43. Meanwhile, pedal 34 of device 5 should be depressed to cut off pipe 32 from pipe 33 and thereby prevent blowdown of control pipe pressure via whistle 31, it being noted that pipe 32 is then connected via suppression valve 37 to the control pipe 6 and that pipe 33 is then connected to said whistle via valve 26 in normal position. As soon as the control pipe 6 has been charged above the aforementioned preselected value of 35 p.s.i., brake valve handle is moved to running position to charge the brake pipe 70 and cause the brake controlling valve device 72 to charge the reservoirs 74, 75 and connect the brake cylinder 65 to release pipe 73, in the manner already explained. Meanwhile, fluid under pressure will flow from control pipe 6 via choke 45 to timing volume 46 for charging the latter, and also flow via cavity 40 of valve 37 to pipe 32.

As power is supplied to the axle 13 and wheel 64 from the traction motors, and the locomotive moves forward, the cam member 1 will be rotated by the gear train 14, 15, 16, 17, 18 and shaft 12, and the fly-ball carrying arms 52 of device 9 will be rotatively driven by the gear train 14, 15, 55, 56, 57, 58 and sleeve 54 and struts 53. When the speed of the driving axle 13 and wheel 64 exceeds a chosen value, corresponding to a locomotive speed of say 5 miles per hour, the speed of the fly-balls 51 will have increased sufficiently to operatively shift shaft 59 upward against resistance of speeder spring 63 and pull the magnet 47 away from disc 48 and thus free valve 26 so that it may be driven downward by spring 27. However, as long as follower roller 21 of the trigger mechanism 2 rides on the cylindrical surface 10 of the now rotating cam member 1, the lever arm 20 will be coaxially aligned with valve 26 and through roller 22 and stem 3 maintain said valve in normal position against the force of spring 27; it being noted that the stem will have moved down a very slight distance, indicated at A, after said valve was freed from the pulling force of magnet 47 and for reasons hereinafter to become apparent, but not far enough to shift valve 26 out of normal position.

When cam lobe 11 is rotated into contact with roller 21, it will rock trigger lever 19, 20 about pin 23 against resistance of spring 25, and carry the roller 22 leftward, as viewed in the drawing, relative to stem 3. Spring 27 will thereupon drive stem 3 down along the right side of roller 22 and lever arm 20 and latch or lock the lever 19, 20 in its rocked position, and meanwhile permit valve 26 to move down to an abnormal position defined by contact with the end wall of chamber 28.

With valve 26 in abnormal position, chamber 28 and hence pipe 33 is cut off from the whistle 31, but pipe 32 is connected to said whistle via an elongated annular cavity 77 in said valve. Since the brake cylinder 65 is vented, control pipe 6 will be connected to pipe 32 by suppression valve 37; and hence pressure fluid stored in volume 46 will start to flow via check valve 44 and pipes 6, 32, 29 to whistle 31 at the rate controlled by choke 30.

The consequent sounding of whistle 31 warns the operator that an automatic safety control application of brakes will be initiated after the expiration of a certain time interval, such as 15 seconds, unless he fails to perform a two-step acknowledging operation presently to be described; it being noted that choke 30 is of greater flow capacity than the charging choke 43, and that pressure fluid will flow from the timing volume 46 at a substantially unrestricted rate via check valve 44 to control pipe 6 for maintaining control pipe pressure high enough, despite blowdown via choke 30 and the whistle, to hold off such brake application during said interval.

To prevent initiation of the safety control application of brakes, the operator should remove his foot from pedal 34 of device 5 to cause pressure fluid to be supplied at a substantially unrestricted rate to pipe 33 for rapidly charging chamber 28 with the pressure fluid that had been stored in timing volume 46. Pressure fluid thus supplied chamber 28 will shift valve 26 upward to its normal position in which the whistle 31 is disconnected from pipe 32 and connected to pipe 33. As the valve 26 moves to normal position, the flow of pressure fluid to the whistle 31 will be momentarily cut off, causing the whistle to stop or change pitch; and hence the operator will know that the valve has actually been shifted to normal position when the whistle 31 again is sounded by the pressure fluid which will now be released from volume 46 at a restricted rate via pipe 33, choke 30 and the whistle.

After a short period of time, which need not exceed ten seconds, and in no event can exceed the aforementioned fifteen seconds, the operator should redepress the pedal 34 for cutting off the pipe 32 from pipe 33 and the whistle 31; whereupon pressure in chamber 28 will blow down promptly and permit spring 27 to shift valve 26 slightly downward through clearance A until stem 3 abuts roller 22 of lever 19, 20. It is intended that during a ten-second period, even at the low speed of 5 miles per hour, arm 20 will have been restored to coaxial alignment with stem 3 by recontact of the roller 21 with cylindrical surface 10 of the cam member 1 under action of spring 25, for the cam lobe will by then have been rotated past the roller 21. Hence, the valve 26 will be maintained in normal position by lever arm 20 and stem 3 until the cam lobe 11 again hits roller 21 and necessitates the next two-step acknowledging operation. Since cam member 1 will rotate even faster at higher train speeds, the operator may redepress pedal 34 in a correspondingly shorter period than ten seconds because the roller 21 will recontact cylindrical surface 10 much sooner.

Assume now that through inattentiveness or illness the operator removes his foot from pedal 34 and thus causes pipe 32 to be connected to pipe 33 at a time when valve 26 is held in normal position by stem 3 and lever arm 20, and while suppression valve 37 connects pipe 6 to pipe 32. In this event, pressure fluid will be released from timing volume 46 via check valve 44 and pipes 6, 32, 33, 29 and whistle 31 at the rate controlled by choke 30, which rate will be faster than control pipe 6 can be charged from the main reservoir 41 via choke 43. After the illustrative 15 seconds, valve device 7 will move to application position for effecting a safety control application of brakes, as above explained.

It will now be understood that a desired control operation, such as an automatic safety control application of brakes, may be initiated by permitting control pipe pressure to be reduced in either of two ways: first, by failing to perform the two-step acknowledging operation (taking one's foot off of pedal 34 and then redepressing said pedal) within a predetermined period of such as 15 seconds whenever whistle 31 sounds periodically in response to tilting of lever 19, 20 by cam lobe 11; and, second, by removing one's foot from pedal 34 for said predetermined period while lever 19, 20 is in its normal position in which roller 21 contacts cam member surface 10. Thus, the pedal 34 should normally be maintained depressed except when performing the two-step acknowledging operation.

Assume now that a safety control application of brakes has been effected responsively to a reduction in control pipe pressure to below the aforementioned preselected value of 35 p.s.i. in either of the two ways just summarized. To recapture control of the train after the brake application has been effected, the operator must move brake valve handle 69 to lap position which, as earlier stated, is the only position of said handle in which the rotary valve 67 cuts off the lock-over passage 76 from atmosphere; whereupon fluid under pressure may be effectively supplied from main reservoir 41 via choke 43 to the control pipe and passage 6 and thus effect return of the valve device 7 to normal position, in which (among other things not pertinent to the invention) branch 6a of control passage 6 is cut off from the lock-over passage 76 and brake pipe pressure is once again placed under control of the rotary valve 67 according to selected position of said handle. Handle 69 may thereafter be moved to running position for effectively recharging the brake pipe 70 and auxiliary reservoir 74 and venting the brake cylinder 65 via release pipe 73, as already described in connection with initial charging.

It is desirable that the operator be relieved of the necessity of making periodic acknowledgements whenever he demonstrates his alertness by performing some other control operation. Thus, with the system associated with a locomotive fluid pressure brake apparatus, the valve 37 of device 8 is biased to a normal position, as shown, to connect the pipes 6 and 32, but is operative when pressure in brake cylinder 65 exceeds a chosen value, such as about 30 p.s.i., to a suppressing position in which it cuts off control pipe 6 from pipe 32 and thus prevents blowdown of control pipe pressure via whistle 31. Hence, if the operator demonstrates his alertness by moving the brake valve handle 69 to manually effect a brake application providing a brake cylinder pressure of over 30 p.s.i., the operator may remove his foot from pedal 34, if he desires, and he will not be required to perform the two-step acknowledging operation even if lever 19, 20 is rocked by cam lobe 11. It is to be noted that while valve 37 is in suppressing position, no pressure fluid will be supplied to whistle 31. However, as soon as brake cylinder pressure is reduced below the illustrative 30 p.s.i., the suppression valve 37 will reconnect control pipe 6 to pipe 32 and cause pressure fluid to be supplied to whistle 31 to warn the operator that he must redepress pedal 34 (if he has not already done so) or that he must perform the two-step acknowledging operation if the lever 19, 20 has in the meantime been rocked by cam lobe 11 and caused the valve 26 to be moved to abnormal position.

It should here be noted that, if the suppression valve device 8 is used and a safety control brake application is initiated, the whistle 31 will stop blowing as soon as brake cylinder pressure exceeds the illustrative 30 p.s.i., but that control pipe pressure will continue to blow down at a service rate via the then vented lockover passage 76, and valve device 7 will remain in application position for operatively effecting a full service reduction in brake pipe pressure and a consequent brake cylinder pressure of say 50 p.s.i.

The speed-controlled device 9 also desirably relieves the operator of the necessity of performing the two-step acknowledging operation while train speed is below 5 miles per hour, because, at speeds less than said 5 miles per hour, the electro-magnet 47, as above noted, is in position for magnetically engaging the metallic disc 48 and thereby effective for holding valve 26 in its normal position. With valve 26 thus restrained from movement out of its normal position, it is of no consequence that lobe 11 on the cam member 1 may rock lever 19—20 out of axial alignment with stem 3, which, if valve 26 were not so restrained or in the absence of fluid pressure in chamber 28, would permit spring 27 to bias valve 26 downwardly to its abnormal position. If, however, brake cylinder pressure does not exceed 30 p.s.i., the operator will have to maintain pedal 34 depressed to cut off communication between pipes 32 and 33 and thereby prevent blow down of timing volume 46 via check valve 44, pipe 6, cavity 40, pipe 32, pipe 33, chamber 28, pipe 29 and whistle 31. Thus, while the operator is attempting to get the train under way from a stop to a speed in excess of 5 miles per hour, or while he is bringing the train to a smooth stop coming into a station, he will not have to perform the two-step acknowledging operation, but will merely have to keep pedal 34 depressed when brake cylinder pressure is less than 30 pounds per square inch.

It will be understood that if a visible rather than an audible warning device is preferred, the whistle 31 may be replaced by a pneumatic switch responsive to charging of pipe 29 to close an electrical circuit for lighting a light on an instrument panel, in which case choke 30 should be relocated so as to be disposed in a branch of pipe 29 leading to atmosphere to permit blowdown of pressure in pipe 29. It should also be understood that the cam member 1 may be rotated at varying speeds by means other than the reduction gear train herein disclosed for purposes of illustration. For instance, rotative speed of cam member 1 could be controlled by a motor driven by a speed-controlled generator that is driven by the shaft or axle 13.

It will thus be seen that the control system will automatically operate to effect a desired control operation if the operator fails to maintain pedal 34 depressed except when performing a two-step acknowledging operation periodically; that successive acknowledging operations will be required at periodic intervals each corresponding to the time necessary for the shaft or axle 13 to complete a predetermined number of revolutions, and hence such acknowledging operations will be required more frequently as the rotative speed of the shaft or axle increases and operatively rotates the cam member 1 proportionately faster, and that in those cases, such as herein disclosed, wherein the axle 13 drives a wheel 64 that moves a prime mover relative to the ground, such successive acknowledging operations will be required at periodic intervals each corresponding to the time necessary for the prime mover to cover a fixed distance since the diameter of the axle-driven wheel is constant and distance is a mathematical function of speed and time.

Having now described the invention, what I claim as new and desire to secure by Letters Patent, is:

1. In a control system of the type comprising a control communication normally charged with fluid under pressure, and a device responsive to a reduction in control communication pressure to below a preselected value to effect a predetermined control operation, the combination of a release communication including a restriction via which pressure fluid may be released at a restricted rate, an operator-controlled acknowledging valve operable to selectively connect the control communication to and disconnect the latter from a chamber, pilot valve means controlled by pressure of fluid in said chamber and an opposing bias pressure and operatively responsive to charging of said chamber to move to one position to connect said chamber to said release communication and operative by said bias pressure upon substantial venting of said chamber to move to another position to disconnect said chamber from the release communication and connect the latter to a branch of the control communication, an element operatively connected to said pilot valve means, mechanism normally acting through said element to hold said pilot valve means in said one position while said chamber is vented, a member operative periodically to actuate the mechanism to a non-holding position to permit said pilot valve means to move to its said other position and cause said element to move into interlocking engagement with said mechanism and prevent its return to the normal holding position unless and until said chamber is charged with pressure fluid by operation of said acknowledging valve to connect position.

2. A control system according to claim 1, wherein said member is a rotatable cam member having an ineffective portion and an effective portion that subtends a very substantially smaller arc than said ineffective portion, and including a vehicle-supporting means rotatable at a variable speed corresponding to the linear speed of such vehicle relative to the ground, and means operatively rotating the came member at a fraction of the rotative speed of said vehicle-supporting means, whereby said mechanism will be actuated to its non-holding position by said cam member at successive time intervals each corresponding to the length of time necessary for the vehicle to cover a predetermined distance relative the ground.

3. A control system according to claim 1, wherein said member is a rotatable cam member having an ineffective portion and an effective portion that subtends a very substantially smaller arc than said ineffective portion, and including an element rotatable at a variable speed, and means controlled by said element and operative to rotate the cam member at a speed proportionate to the rotative speed of the element, whereby said mechanism will be actuated to its non-holding position by said cam member at successive time intervals each corresponding to the length of time necessary for said element to complete a predetermined number of revolutions necessary to effect one revolution of said cam member.

4. A control system according to claim 3, including speed-controlled means, controlled by rotative speed of said element and operative to maintain said pilot valve in its said one position only when rotative speed of said element is reduced below a chosen low value.

5. A control system according to claim 3, including an electro-magnet operative to magnetically hold said pilot valve in its said one position if it is moved into effective contact therewith while said pilot valve is in said one position, and a fly-ball-type governor operatively driven by said element for moving said magnet into and out of effective holding contact with said pilot valve responsively to decrease and increase, respectively, in rotative speed of said element, whereby said magnet will effectively hold said pilot valve in said one position only when said element rotates at less than a preselected speed.

6. The combination, with an element rotatable at a variable speed, a control communication normally charged with fluid under pressure, and a device responsive to a reduction in control communication pressure to below a preselected value to effect a preselected control operation of: a control system comprising a release communication including a restriction via which pressure fluid may be released at a restricted rate, warning means operative to give a warning while the release communication contains pressure fluid, an operator-controlled acknowledging valve operable to selectively connect the control communication to and disconnect the latter from a chamber, pilot valve means controlled by pressure of fluid in said chamber and an opposing bias pressure and operative in one position to connect said release communication to said chamber or in another position to a branch of the control communication according to wether said chamber is respectively charged with fluid under pressure or vented, a double-acting pusher stem operatively connected to said pilot valve means, a rockable lever means having two positions in which it is respectively effective and ineffective to apply a thrust force to said pilot valve means to maintain the latter in its said one position, a rotatable cam member, and means operably responsive to rotation of the element to rotate said cam member at a proportion of the rotative speed of the element, said cam member having an effective portion which periodically during rotation of said cam member operatively rocks said lever means to its ineffective position to permit said pilot valve means to be actuated by the bias pressure to its said other position and cause said stem to move into wedge-like engagement with said lever means and prevent the latter's return to effective position unless and until said chamber is charged with pressure fluid by operation of said acknowledging valve to its connection-establishing position, whereby said acknowledging valve must normally be maintained in its connection-disestablishing position to prevent continuous blowdown of pressure fluid from the control communication via said release communication and must be periodically operated temporarily to the connection-establishing position to effect return of the pilot valve means to its said one position and also unwedge the stem whenever said lever means is actuated to ineffective position by said cam member at the expiration of successive time intervals which become progressively shorter as rotative speed of the element increases.

7. The combination according to claim 6, further characterized in that the element is one of the rotatable driving elements that supports a vehicle for movement relative to the ground, and said successive time intervals correspond to the length of time necessary for the vehicle to traverse a predetermined distance along the ground.

8. The combination according to claim 7, including fluid pressure operable brake applying means for braking the vehicle, and a suppression valve interposed in the control communication between a portion leading to the device and the portion including said branch leading to said acknowledging valve and to said pilot valve means, said suppression valve normally being biased to a non-suppressing position in which it connects said portions to each other and being operably responsive to supply of pressure fluid to said brake applying means at a pressure exceeding a chosen value to a suppressing position in which it disconnects said portions from each other, whereby blowdown of pressure fluid from the control communication via said release communication will be prevented while the suppression valve is in suppressing position irrespective of the then existing positions of the acknowledging valve and pilot valve means.

9. A control system comprising, in combination, a control communication normally charged with fluid under pressure, a device connected via a fluid pressure communication with said control communication and responsive to a reduction in control communication pressure to below a preselected value to effect a predetermined control operation, pneumatically actuated warning means, a bleed choke via which pressure fluid may blow down to atmosphere at a restricted rate, an operator-controlled acknowledging valve operable selectively to establish and disestablish a connection between the control communication and a chamber, a two-position pilot valve means controlled by a bias pressure acting in opposition to pressure of fluid in said chamber and operatively responsive to charging of said chamber to one position to connect said chamber to said choke and warning means and operative by said bias pressure upon substantial venting of said chamber to another position to disconnect said chamber from the choke and warning means and connect said choke and warning means to a branch of the control communication, mechanism having an effective position in which it is effective to operatively maintain said pilot valve means in said one position, if already there, despite venting of said chamber and having an ineffective position in which it permits movement of said pilot valve means to said other position, a member operative periodically to actuate said mechanism to ineffective position, whereby the operator must demonstrate his alertness by maintaining said acknowledging valve in connection-disestablishing position except when such warning is given, whereupon he must successively operate said acknowledging valve to connection establishing position and then to connection-disestablishing position in order to prevent initiation of the control operation by blowdown of control communication pressure to below said preselected value via said pilot valve means in said other position.

10. A control system according to claim 9, including a driving element rotatable at variable speed, and means providing an operating connection between said member and element to cause said member to actuate said member to ineffective position periodically each time said driving element completes a predetermined number of revolutions.

11. A control system according to claim 9, in combination with a linearly movable prime mover having a rotatable driving element, and including means providing an operative connection between said member and element to cause said member to actuate said mechanism to ineffective position periodically each time the prime mover traverses a predetermined linear distance.

12. In a locomotive fluid pressure brake apparatus of type comprising a brake controlling valve device responsive to a reduction in pressure of fluid in a normally charged brake pipe to effect supply of fluid under pressure to a brake cylinder for effecting an application of brakes, a control communication normally charged with fluid under pressure, and an application valve device responsive to a reduction in control communication pressure to below a preselected value to effect a reduction in brake pipe pressure, the combination of a release communication including a restriction via which pressure fluid may be released to atmosphere at a restricted rate, pneumatically actuated warning means operative to give a warning while the release communication contains pressure fluid, an operator-controlled acknowledging valve operable selectively to establish and disestablish a connection between the control communication and a chamber, a two-position pilot valve means controlled by a bias pressure acting in opposition to pressure of fluid in said chamber and operatively responsive to charging of said chamber to one position to connect said chamber to said release communication and operative by said bias pressure upon substantial venting of said chamber to another position to disconnect said chamber from the release communication and connect the latter to a branch of the control communication, mechanism having an effective position in which it is effective to operatively maintain said pilot valve means in said one position, if already there, despite venting of said chamber and having an ineffective position in which it permits movement of said pilot valve means to said other position by said bias pressure, means operatively connected to a driving axle of the locomotive for sensing locomotive speed, and a member controlled by the last-mentioned means and operative to actuate said mechanism to ineffective position periodically each time the axle completes a predetermined number of revolutions, whereby the operator must demonstrate his alertness by maintaining said acknowledging valve in connection-disestablishing position except when such warning is given, whereupon he must successively operate said acknowledging valve to connection establishing position and then to connection-disestablishing position in order to prevent automatic initiation of an application of brakes.

13. The combination according to claim 12, including a suppression valve interposed in the control communication and operatively responsive to a brake cylinder pressure in excess of a chosen value to a suppressing position in which it cuts off one portion of the control communication leading to the application valve device from other portions of the control communication leading to the pilot valve means and acknowledging valve, said suppression valve being biased to a non-suppressing position to interconnect all of said portions upon a reduction in brake cylinder pressure to below said chosen value, whereby blowdown of control communication pressure in said one portion will be prevented while said suppression valve is in suppressing position.

References Cited in the file of this patent

UNITED STATES PATENTS

| | | |
|---|---|---|
| 1,499,323 | Nein et al. | June 24, 1924 |
| 1,687,107 | Ruegg | Oct. 9, 1928 |
| 2,263,330 | Farmer | Nov. 18, 1941 |
| 2,785,931 | Gorman | Mar. 19, 1957 |
| 2,820,677 | Jados | Jan. 21, 1958 |
| 2,961,274 | McClure et al. | Nov. 22, 1960 |